Figure 1:
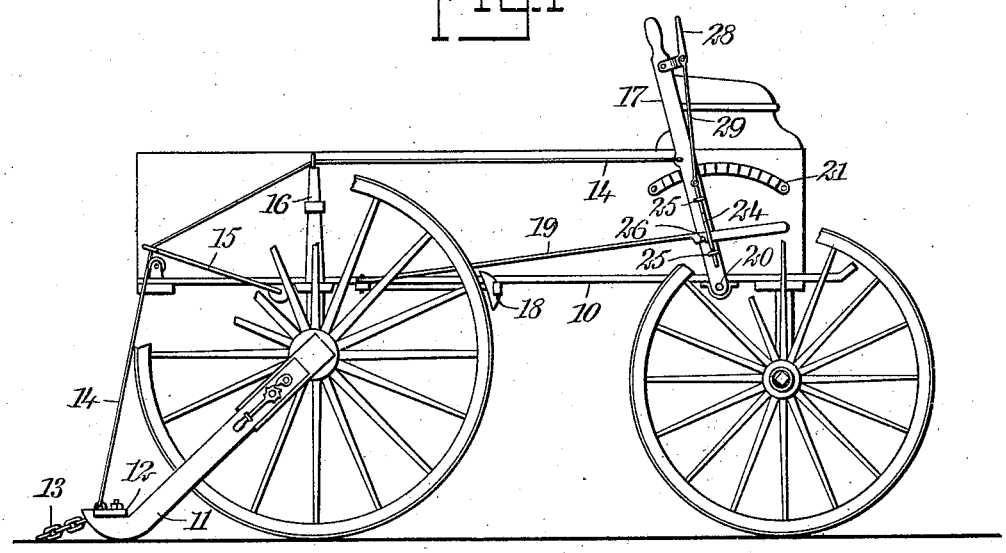

No. 877,097. PATENTED JAN. 21, 1908.
F. W. LECHNER.
BRAKE HANDLE.
APPLICATION FILED JAN. 16, 1907.

WITNESSES
INVENTOR
Frederick W. Lechner
BY
ATTORNEYS

UNITED STATES PATENT OFFICE.

FREDERICK W. LECHNER, OF WENONA, ILLINOIS.

BRAKE-HANDLE.

No. 877,097.　　　　Specification of Letters Patent.　　　Patented Jan. 21, 1908.

Application filed January 16, 1907. Serial No. 352,562.

*To all whom it may concern:*

Be it known that I, FREDERICK W. LECHNER, a citizen of the United States, and a resident of Wenona, in the county of Marshall and State of Illinois, have invented a new and Improved Brake-Handle, of which the following is a full, clear, and exact description.

This invention relates to a new and improved handle especially adapted for use in the operation of a plurality of different mechanisms.

More particularly, the invention relates to a handle adapted to be used in connection with vehicles for operating the brakes and other mechanism which may be used in connection with the vehicles.

In the drawing the device is illustrated as being employed in connection with the road-smoothing device illustrated and claimed in my application, Serial No. 324,186, filed June 30, 1906.

Figure 2:
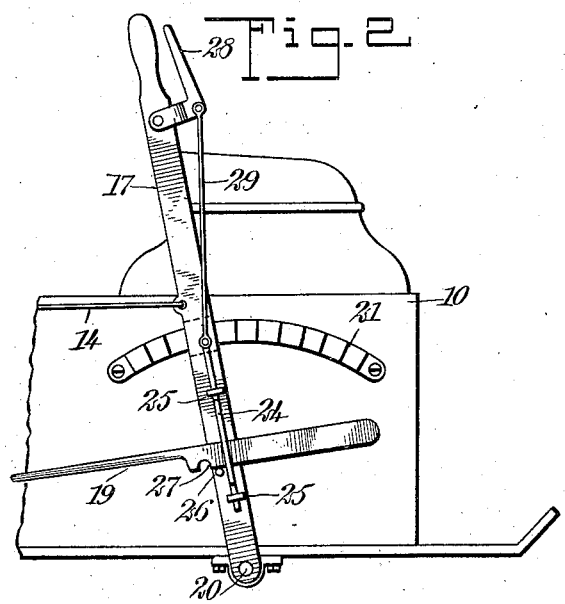
Figure 3:
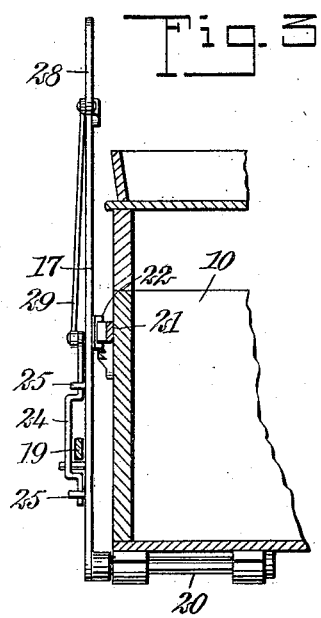
Figure 4:
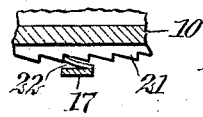

Reference is to be had to the accompanying drawings forming a part of this specification, in which similar characters of reference indicate corresponding parts in all the figures, in which Figure 1 is a side elevation of a vehicle having my improved device attached thereto; Fig. 2 is a side elevation of my improved device showing the same on a larger scale; Fig. 3 is a front elevation of the device, the vehicle being shown in section; and Fig. 4 is a detail showing in transverse section the engagement of the handle with the notched bar.

In the drawings there is illustrated a vehicle 10 having a road-smoothing device pivotally secured to the ends of the rear axle, and comprising downwardly-extending arms 11, a cross member 12, a smoothing chain 13, and a cord or wire 14 by which the smoothing device may be raised or lowered. This cord is connected to a pivoted arm 15 and passes through an eyelet in a standard 16, the front end of the cord or wire being secured to my improved handle 17. The vehicle is provided with any suitable form of brake 18 adapted to be operated by the longitudinal movement of the bar 19, the end of which is also in operative engagement with the handle 17.

The specific object of my invention is to provide means whereby the road-smoothing device may be raised or lowered at will by the same handle employed to operate the brakes, and whereby the brakes may be readily operated by the handle whenever desired.

In the specific form of my invention illustrated in the accompanying drawings, I provide a handle 17 comprising a straight metal bar rigidly secured to a journal 20 rotatably mounted on the under side of the wagon body. The cord or wire 14 is secured to the handle intermediate its ends and by the forward or backward movement of the handle the smoothing device may be readily raised or lowered. The side of the wagon body is provided with a curved bar 21 having teeth with which a projection 22 on the handle may engage to hold the handle in any desired position. The brake bar 19 lies in engagement with the side of the handle 17 and is held in place by a loop 24 longitudinally movable in respect to the handle and supported within bearing blocks 25. The loop 24 is of a width substantially equal to the thickness of the bar 19 and prevents lateral movement of the bar, but by moving the loop longitudinally the bar may be raised or lowered. The handle carries a pin or lug 26, normally engaging with the under side of the bar 19, and the bar is provided with a recess or notch 27 into which this pin or projection 26 may enter. When the pin and notch are in engagement any movement of the handle 17 causes a corresponding movement of the bar 19, and the brakes may thus be readily operated; but when the pin 26 is out of engagement with the notch, any forward or backward movement of the handle 17 does not cause any longitudinal movement of said rod. The loop 24 serves a double purpose of holding the bar in engagement with the handle and of raising or lowering the bar out of engagement with the projection or lug 26. In order to effect the latter, I provide a small pivoted member 28 adjacent the upper end of the handle 17, and for connecting the lower end of this handle 28 to the loop 24, I provide a connecting link 29. By pressing the two handles together, the loop 24 is raised and the lower portion thereof engages with the under side of the bar 19 and disengages it from the projection 26 to permit free movement of the road-smoothing device without interfering with the brakes.

When it is desired to operate the brakes, the handle 28 is released and the bar 19 drops down until it rests upon the projection. The handle 17 is then moved forward or backward until the notch and projection are in engagement and then further movement of the handle 17 serves to operate the brakes.

The handle 17 normally engages with the toothed bar 21 and is held from accidental displacement. In order to move the handle, it is necessary that it first be sprung laterally out of engagement with the toothed bar, the material of the handle being sufficiently resilient to permit of such action. The instant the handle is released, it automatically engages with the toothed bar and is rigidly held in place.

Having thus described my invention, I claim as new and desire to secure by Letters Patent:

1. A device of the class described, comprising a pivoted handle bar having a projection or pin extending outwardly therefrom, a longitudinally movable bar having one end normally supported upon said pin and having a notch adapted to engage therewith, said bar being otherwise unattached to said handle, and means carried by the handle for bringing said projection and notch out of operative engagement.

2. A device of the class described, comprising a pivoted handle having a projection extending outwardly therefrom, a bar normally supported upon said projection and having a notch adapted to receive the same, a loop mounted on said handle and inclosing said bar, and means carried by the handle for moving the loop to bring the bar out of engagement with the projection.

3. A device of the class described, comprising a pivoted handle, a pin carried thereby, a bar adapted to be moved longitudinally by said handle and normally engaging with said pin, a loop carried by the handle and inclosing said bar, means carried by the handle for moving the loop longitudinally to bring the bar out of engagement with the projection, and means connected to said handle intermediate its ends and adapted to be operated by the handle independently of the bar.

4. A device of the class described, comprising a pivoted handle, a bar adapted to be moved longitudinally thereby and having one end normally supported by said handle, the handle and bar being provided with a projection and a recess, whereby the bar may be moved longitudinally by the handle, and means carried by said handle for disengaging the bar from the handle and permitting sliding engagement of one in respect to the other.

5. In combination, a vehicle, a road-smoothing device secured thereto, brakes carried thereby, a handle pivotally mounted on said vehicle, means connecting said smoothing device and said handle, whereby the former may be operated, a bar having one end operatively connected to the brakes and the other end in engagement with the handle, means carried by said handle for engaging with said bar to move the same longitudinally, and means carried by the handle for disengaging the bar and permitting sliding engagement of the handle with the bar.

In testimony whereof I have signed my name to this specification in the presence of two subscribing witnesses.

FREDERICK W. LECHNER.

Witnesses:
 DORA KLIEBER,
 ANNA WINTER.